(12) United States Patent
Kim et al.

(10) Patent No.: US 12,518,790 B2
(45) Date of Patent: Jan. 6, 2026

(54) SYSTEM ON CHIP, METHOD FOR OPERATING THEREOF AND VIDEO SYSTEM

(71) Applicant: SAMSUNG ELECTRONICS CO., LTD., Suwon-si (KR)

(72) Inventors: Tae Hwan Kim, Suwon-si (KR); Sung Ho Roh, Suwon-si (KR); Jung Yeop Yang, Suwon-si (KR); Jong Seong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/827,934

(22) Filed: Sep. 9, 2024

(65) Prior Publication Data

US 2025/0279120 A1   Sep. 4, 2025

(30) Foreign Application Priority Data

Mar. 4, 2024 (KR) .................. 10-2024-0030848

(51) Int. Cl.
| | |
|---|---|
| *G11B 20/00* | (2006.01) |
| *G11B 20/10* | (2006.01) |
| *H04N 19/172* | (2014.01) |
| *H04N 19/423* | (2014.01) |

(52) U.S. Cl.
CPC ........... *G11B 20/00007* (2013.01); *G11B 20/10527* (2013.01); *H04N 19/172* (2014.11); *H04N 19/423* (2014.11); *G11B 2020/00072* (2013.01); *G11B 2020/10675* (2013.01)

(58) Field of Classification Search
None
See application file for complete search history.

(56) References Cited

U.S. PATENT DOCUMENTS

| | | | |
|---|---|---|---|
| 6,301,428 B1 * | 10/2001 | Linzer | H04N 21/23424 |
| 8,731,067 B2 | 5/2014 | Wu et al. | |
| 9,819,970 B2 | 11/2017 | Sermadevi et al. | |
| 10,230,970 B2 | 3/2019 | Rodriguez et al. | |
| 11,477,471 B2 | 10/2022 | Choi et al. | |
| 11,604,726 B2 | 3/2023 | Xu | |
| 2004/0008767 A1 * | 1/2004 | Ueda | H04N 9/8042 |
| | | | 375/E7.145 |
| 2012/0033727 A1 | 2/2012 | Shor et al. | |

(Continued)

*Primary Examiner* — Hung Q Dang
(74) *Attorney, Agent, or Firm* — MORGAN, LEWIS & BOCKIUS LLP

(57) ABSTRACT

A system on chip includes: a codec encoding image frames; and a codec controller sending the image frames to the codec and allocating a buffer for encoding the image frames. The codec controller sends a first image frame to the codec. The codec controller allocates the first buffer to a memory and sends the first image frame to the codec. The codec encodes the first image frame and sends the encoded first image frame to the codec controller. The codec controller allocates the first buffer to the memory and sends a second image frame to the codec. The codec requests the codec controller to allocate a second buffer of a second size. The codec controller allocates the second buffer to the memory and sends the second image frame to the codec, and the codec encodes the second image frame and sends the encoded second image frame to the codec controller.

20 Claims, 16 Drawing Sheets

(56) References Cited

U.S. PATENT DOCUMENTS

| | | | |
|---|---|---|---|
| 2013/0279877 A1* | 10/2013 | Boak | H04N 21/41407 |
| | | | 386/349 |
| 2018/0108331 A1* | 4/2018 | Chao | H04N 19/423 |
| 2020/0374553 A1* | 11/2020 | Ma | H04N 19/159 |
| 2020/0396384 A1* | 12/2020 | Hu | H04N 23/64 |
| 2021/0089446 A1* | 3/2021 | Fruchter | G06F 15/167 |
| 2023/0113310 A1* | 4/2023 | Nadler | H04N 23/81 |
| | | | 348/169 |
| 2023/0119084 A1 | 4/2023 | Wang | |

* cited by examiner

FIG. 10

|        | Resolution    | Memory Size    | Number of Interaction |
|--------|---------------|----------------|-----------------------|
| Max    | 8K -> 2K -> 4K | 38,654,705,664 | 18                    |
| Method 1 | 8K -> 2K -> 4K | 75,202,560   | 36                    |

FIG. 12

|          | Resolution    | Memory Size    | Number of Interaction |
|----------|---------------|----------------|-----------------------|
| Max      | 8K -> 2K -> 4K | 38,654,705,664 | 18                    |
| Method 1 | 8K -> 2K -> 4K | 75,202,560     | 36                    |
| Method 2 | 8K -> 2K -> 4K | 99,532,800     | 22                    |

SYSTEM ON CHIP, METHOD FOR OPERATING THEREOF AND VIDEO SYSTEM

CROSS-REFERENCE TO RELATED APPLICATION

This application claims priority under 35 USC § 119 to Korean Patent Application No. 10-2024-0030848 filed on Mar. 4, 2024 in the Korean Intellectual Property Office, the disclosure of which is incorporated by reference herein in its entirety.

TECHNICAL FIELD

The present inventive concept relates to a system on a chip (SoC), a method for operating thereof, and a video system.

DISCUSSION OF THE RELATED ART

There are a variety of electronic devices that use or display still and video images, and the amount of image data used in the electronic devices has significantly increased as technology has developed and the transmission of information has increased. These significant amounts of video content and image data are broadcast to various electronic devices such as mobile devices. The development in video encoding/decoding technology enables sending of more image data through channels with limited bandwidth, and enables storage of video data with high resolution within limited storage capacity. More efficient video coding technologies may be desirable with the increased use of video content.

SUMMARY

According to exemplary embodiments of the present inventive concept, a system on chip (SoC) includes: a codec configured to encode a plurality of image frames; and a codec controller configured to send the plurality of image frames to the codec and to allocate a buffer for encoding the plurality of image frames in a memory, wherein the codec controller sends a first image frame with a first resolution to the codec without allocating the buffer, the codec requests the codec controller to allocate a first buffer of a first size that corresponds to the first resolution, in response to receiving the first image frame, the codec controller allocates the first buffer to the memory and sends the first image frame to the codec, the codec encodes the first image frame by using the first buffer and then sends the encoded first image frame to the codec controller, the codec controller allocates the first buffer to the memory and sends a second image frame with a second resolution that is smaller than the first resolution to the codec, the codec requests the codec controller to allocate a second buffer of a second size that is smaller than the first size, in response to receiving the second image frame, the codec controller allocates the second buffer to the memory and sends the second image frame to the codec, and the codec encodes the second image frame by using the second buffer and then sends the encoded second image frame to the codec controller.

According to exemplary embodiments of the present inventive concept, a method for operating a system on chip (SoC) includes a codec that is configured to sequentially encode a plurality of image frames, and a codec controller that is configured to send the plurality of image frames to the codec and allocate a buffer for encoding the plurality of image frames in a memory, the method includes: sending a first image frame with a first resolution to the codec without allocating the buffer, through the codec controller; requesting, through the codec, the codec controller to allocate a first buffer of a first size corresponding to the first resolution, in response to receiving the first image frame; allocating the first buffer to the memory and sending the first image frame to the codec, through the codec controller; encoding the first image frame by using the first buffer and then sending the encoded first image frame to the codec controller, through the codec; allocating the first buffer to the memory and sending a second image frame with a second resolution that is smaller than the first resolution to the codec, through the codec controller; requesting the codec controller to allocate a second buffer of a second size that is smaller than the first size, in response to receiving the second image frame; allocating the second buffer to the memory and sending the second image frame to the codec; and encoding the second image frame by using the second buffer and then sending the encoded second image frame to the codec controller.

According to exemplary embodiments of the present inventive concept, a video system includes: a codec configured to encode a plurality of image frames; a codec controller configured to send the plurality of image frames to the codec and to allocate a buffer for encoding the plurality of image frames in a memory; a camera configured to send the plurality of image frames to the codec controller; and a display configured to display the plurality of image frames, wherein the codec controller sends a first image frame with a first resolution to the codec without allocating the buffer, the codec requests the codec controller to allocate a first buffer of a first size that corresponds to the first resolution, in response to receiving the first image frame, the codec controller allocates the first buffer to the memory and sends the first image frame to the codec, the codec encodes the first image frame by using the first buffer and then sends the encoded first image frame to the codec controller, the codec controller allocates the first buffer to the memory and sends a second image frame with a second resolution that is smaller than the first resolution to the codec, the codec requests the codec controller to allocate a second buffer of a second size that is smaller than the first size, in response to receiving the second image frame, the codec controller allocates the second buffer to the memory and sends the second image frame to the codec, and the codec encodes the second image frame by using the second buffer and then sends the encoded second image frame to the codec controller.

BRIEF DESCRIPTION OF THE DRAWINGS

The above and other aspects and features of the present inventive concept will become more apparent by describing in detail exemplary embodiments thereof with reference to the attached drawings, in which:

FIG. 10 is a table for describing the effects of a video system according to exemplary embodiments of the present inventive concept.

FIG. 12 is a table for describing the effects of a video system according to exemplary embodiments of the present inventive concept.

DETAILED DESCRIPTION OF THE EMBODIMENTS

Figure 1:
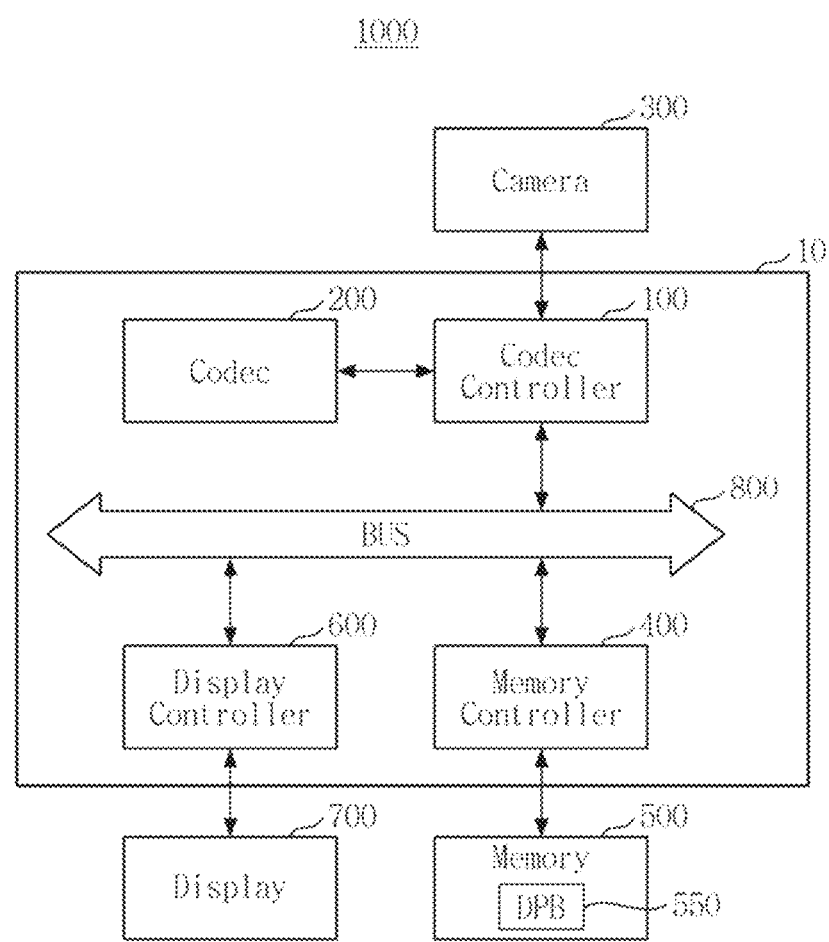
FIG. 1 is a block diagram for describing a video system according to exemplary embodiments of the present inventive concept.

Hereinafter, exemplary embodiments of the present inventive concept will be described in detail with reference to the accompanying drawings. The same reference numerals are used for the same components in the drawings and specification, and duplicate descriptions thereof may be omitted or briefly discussed.

FIG. 1 is a block diagram for describing a video system according to exemplary embodiments of the present inventive concept.

Referring to FIG. 1, a video system 1000 according to exemplary embodiments of the present inventive concept may include a system on chip (SoC) 10 for encoding or decoding video (hereinafter referred to as system on chip for convenience of explanation), a camera 300, a memory 500, and a display 700.

In the video system 1000 according to exemplary embodiments of the present inventive concept, the memory 500 is disposed outside the system on chip 10, but the present inventive concept is not limited thereto, and for example, the memory 500 may be implemented inside the system on chip 10.

The system on chip 10 may generally control an operation of the video system 1000. For example, the system-on-chip 1000 may be an integrated circuit (IC), a motherboard, an application processor (AP), or a mobile AP.

The system on chip 10 may process image data that is output from the camera 300, such as image frames, to generate a stream, and may display the processed stream through the display 700 and/or store the processed stream in the memory 500.

The system on chip 10 may include a codec controller 100, a codec 200, a memory controller 400, and a display controller 600.

The codec controller 100, the codec 200, the memory controller 400, and the display controller 600 may exchange data with each other through a bus 800. For example, the bus 800 may be implemented as a peripheral component interconnect (PCI) bus, a PCI express bus, an advanced microcontroller bus architecture (AMBA), an advanced high performance bus (AHB), an advanced peripheral bus (APB), or an advanced extensible interface (AXI) bus, or a combination thereof.

The codec 200 may encode frames that are obtained from the camera 300 or frames that are stored in the memory 500, or may decode streams that are stored in the memory 500. For example, the camera 300 may be implemented as a complementary metal oxide semiconductor (CMOS) image sensor.

The system on chip 10 may further include, for example, a central processing unit (CPU), a neural processing unit (NPU), a graphics processing unit (GPU), a digital signal processing processor (DSP), etc., but the present inventive concept is not limited thereto.

The display controller 600 may display the image frame that is output from the codec controller 100 on the display 700. For example, the display 700 may be implemented as a monitor, a TV monitor, a projection device, a thin film transistor-liquid crystal display (TFT-LCD), a light emitting diode (LED) display, an organic LED (OLED) display, an active-matrix OLED (AMOLED) display, or a flexible display, but the present inventive concept is not limited thereto.

For example, the display controller 600 may send the image data to the display 700 through a display serial interface (DSI).

The memory controller 400 may read the data that is stored in the memory 500 based on a command output from the codec controller 100 and may send the read data to the codec controller 100. In addition, the memory controller 400 may write data that is output from the codec controller 100 to the memory 500 based on the command that is output from the codec controller 100.

According to exemplary embodiments of the present inventive concept, the memory 500 may be implemented as a volatile memory or a non-volatile memory. The volatile memory may be implemented as a random access memory (RAM), a static RAM (SRAM), a dynamic RAM (DRAM), a synchronous DRAM (SDRAM), a thyristor RAM (T-RAM), a zero capacitor RAM (Z-RAM), or a twin transistor RAM (TTRAM), but the present inventive concept is not limited thereto.

For example, the non-volatile memory may be implemented as an electrically erasable programmable read-only memory (EEPROM), a flash memory, a magnetic RAM (MRAM), a spin-transfer torque MRAM, a ferroelectric RAM (FeRAM), a phase change RAM (PRAM)), or a resistive RAM (RRAM). In addition, the non-volatile memory may be implemented as, for example, a multimedia card (MMC), an embedded MMC (eMMC), a universal flash storage (UFS), a solid state drive (SSD), a USB flash drive, or a hard disk drive (HDD), but the present inventive concept is not limited thereto.

The memory 500 may include a decoded picture buffer (DPB) 550. When encoding or decoding is performed in the system on chip 10, the image frames may be stored in the DPB 550 in the form of reference frames. The frames that are stored in the DPB 550 may be used to encode or decode video. The DPB 550 may be implemented as, for example, a random access memory (RAM), a static RAM (SRAM), a dynamic RAM (DRAM), a synchronous DRAM (SDRAM), a thyristor RAM (T-RAM), a zero capacitor RAM (Z-RAM), or a twin transistor (TTRAM), but the present inventive concept is not limited thereto.

Figure 2:
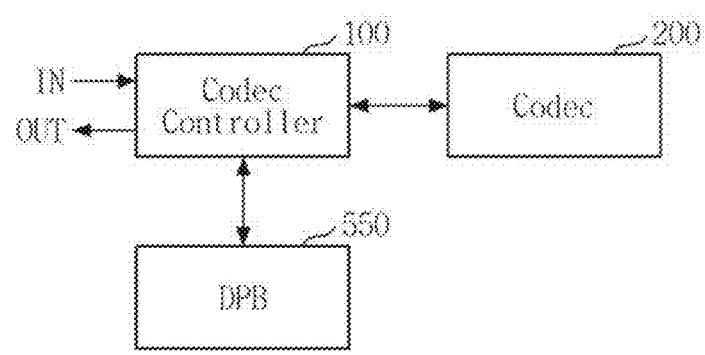
FIG. 2 is a block diagram for describing some components of the system on chip illustrated in FIG. 1.

FIG. 2 is a block diagram for describing some components of the system on chip illustrated in FIG. 1.

Referring to FIG. 2, the system on chip 10 may include a codec controller 100 and a codec 200. The codec controller 100 may receive input data IN from other components (e.g., the camera 300, the memory 500, etc.) that are within the video system 1000. However, the codec controller 100 might not directly encode or decode the input data IN. Therefore, the codec controller 100 may send the input data IN to the codec 200.

The codec 200 may directly encode or decode the input data IN received from the codec controller 100. The input data IN may be an image frame with arbitrary or predetermined resolution. For example, the resolution may be 2K, 4K, 5K, or 8K, but the exemplary embodiment of the present inventive concept is not limited thereto. However, the codec 200 might not directly allocate the DPB 550. Therefore, when a buffer of a size that is different from the resolution of the input data IN is allocated, the codec 200 may request the codec controller 100 to allocate a buffer of a new size.

The codec controller 100 may allocate the DPB 550 having the same size as the resolution of the input data IN and send the input data IN to the codec 200. Output data OUT encoded or decoded by the codec 200 may be sent to the codec controller 100, and the codec controller 100 may send the output data OUT to other components (e.g., memory 500, display 700, etc.) that are within the video system 1000.

For example, the input data IN may be an image frame sent from the camera 300. The codec controller 100 may send the image frame to the codec 200. When allocation of the DPB 550 with a new size is required, the codec 200 may request such allocation from the codec controller 100. For example, the codec 200 may request the codec controller 100 to allocate a buffer of the same size as the resolution of the image frame. The codec controller 100 may allocate the buffer of the requested size in the DPB 550 and send the image frame to the codec 200. The codec 200 may send an encoded image frame that is obtained by encoding the image frame to the codec controller 100. The codec controller 100 may store the encoded image frame in the memory 500. However, the exemplary embodiment of the present inventive concept is not limited thereto.

For example, the input data IN may be the encoded image frame sent from the memory 500. The codec controller 100 may send the encoded image frame to the codec 200. When allocation of the DPB 550 with a new size is required, the codec 200 may request such allocation from the codec controller 100. For example, the codec 200 may request the codec controller 100 to allocate a buffer of the same size as the resolution of the image frame. The codec controller 100 may allocate the buffer of the requested size in the DPB 550 and send the encoded image frame to the codec 200. The codec 200 may send an image frame obtained by decoding the encoded image frame to the codec controller 100. The codec controller 100 may display the image frame on the display 700. However, the exemplary embodiment of the present inventive concept is not limited thereto.

Figure 3:
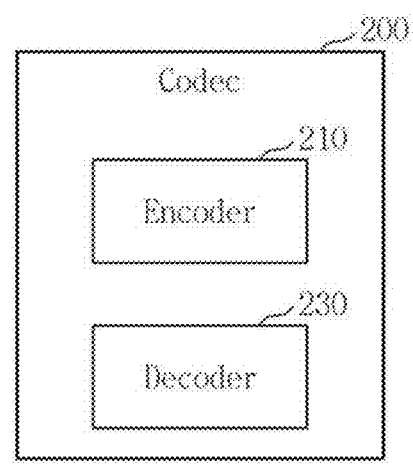
FIG. 3 is a block diagram for describing the codec illustrated in FIG. 2.
Figure 4:
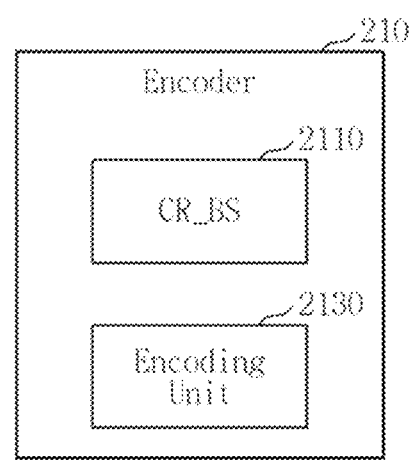
FIG. 4 is a block diagram for describing an encoder illustrated in FIG. 3.
Figure 5:
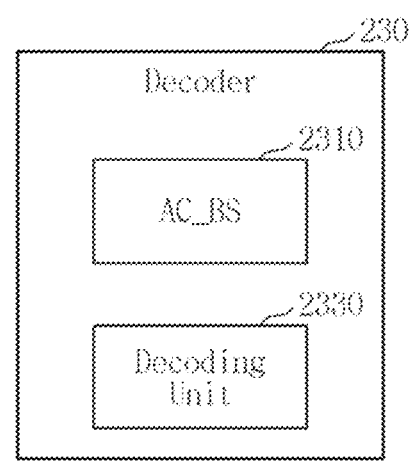
FIG. 5 is a block diagram for describing a decoder illustrated in FIG. 3.

FIG. 3 is a block diagram for describing the codec illustrated in FIG. 2. FIG. 4 is a block diagram for describing an encoder illustrated in FIG. 3. FIG. 5 is a block diagram for describing a decoder illustrated in FIG. 3.

Referring to FIGS. 3 to 5, the codec 200 may include an encoder 210 and a decoder 230. The encoder 210 may encode the image frame that is sent from the codec controller 100 and may send the encoded image frame to the codec controller 100. The decoder 230 may decode the encoded image frame that is sent from the codec controller 100, and may send the decoded image frame to the codec controller 100.

The encoder 210 may include a bitstream generation unit (CR_BS) (e.g., a bitstream generation circuit) 2110 and an encoding unit (e.g., an encoding circuit) 2130. The bitstream generation unit 2110 and the encoding unit 2130 may include at least one processor. In addition, the bitstream generation unit 2110 and the encoding unit 2130 may include a memory that stores instructions that are to be performed by at least one processor.

The encoding unit 2130 may receive an image frame and encode the image frame to generate an encoded image frame. The bitstream generation unit 2110 may generate a bitstream based on the encoded image frame. The bitstream generated by the bitstream generation unit 2110 may be stored in the memory 500.

The decoder 230 may include a bitstream acquisition unit (AC_BS) 2310 and a decoding unit (e.g., a decoding circuit) 2330. For example, the bitstream acquisition unit 2310 and the decoding unit 2330 may include at least one processor. In addition, the bitstream acquisition unit 2310 and the decoding unit 2330 may include a memory that stores instructions that are to be performed by at least one processor.

The bitstream acquisition unit 2310 may receive a bitstream. The bitstream includes the encoded image frame that is obtained by encoding the image frame by the above-described encoding unit 2130. The bitstream acquisition unit 2310 may receive a bitstream from the memory 500. The decoding unit 2330 may restore the encoded image frame based on information that is obtained from the received bitstream.

Figure 6:
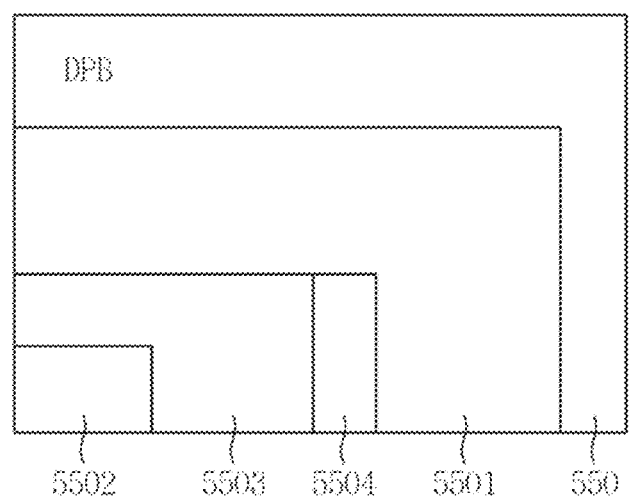
FIG. 6 is a block diagram for describing the DPB illustrated in FIG. 1.

FIG. 6 is a block diagram for describing the DPB illustrated in FIG. 1.

Referring to FIG. 6, when encoding or decoding is performed in the system on chip 10, the DPB may store the image frames in the form of reference frames. The image frames stored in the DPB 550 may be used to encode or decode video.

The codec controller 100 may allocate a buffer with an arbitrary or predetermined size within the DPB 550. For example, the codec controller 100 may allocate a buffer of a size corresponding to a first area 5501. The size of the first area 5501 may be, for example, 64 k*64 k (hereinafter, referred to as 8K). The codec controller 100 may allocate a buffer of a size corresponding to a second area 5502. The size of the second area 5502 may be, for example, 2048 k*1080 k (hereinafter, referred to as 2K). The codec controller 100 may allocate a buffer of a size corresponding to a third area 5503. The size of the third area 5503 may be, for example, 3840 k*2160 k (hereinafter, referred to as 4K). The codec controller 100 may allocate a buffer of a size corresponding to a fourth area 5504. The size of the fourth area 5504 may be, for example, 5120 k*2160 k (hereinafter, referred to as 5K).

As described above with reference to FIG. 2, the codec controller 100 may allocate the buffer with an arbitrary or predetermined size within the DPB 550.

Buffers corresponding to the first to fourth areas 5501 to 5504 may store image frames with a resolution smaller than or equal to the size of each buffer. When the resolution of the image frame is greater than the size of the buffer, a page fault error may occur.

In the drawing, only the first to fourth areas 5501 to 5504 having different sizes are illustrated, but the exemplary embodiment of the present inventive concept is not limited thereto. For example, the DPB 550 may also include a buffer corresponding to an area different from the first to fourth areas 5501 to 5504.

In addition, in the drawing, the first to fourth areas 5501 to 5504 are illustrated as overlapping, but the exemplary embodiment of the present inventive concept is not limited thereto. For example, a plurality of buffers in the DPB 550 may also be allocated without overlapping each other.

Figure 7:
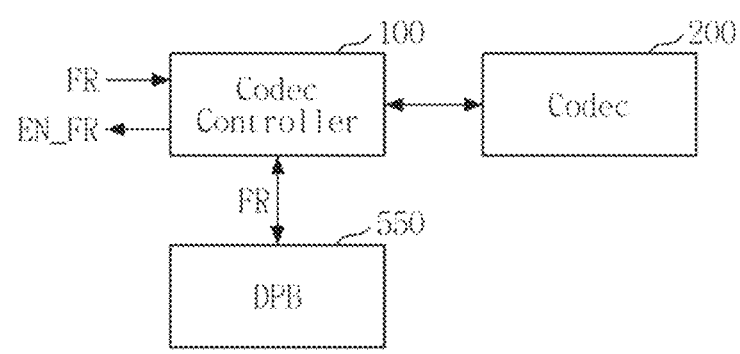
FIG. 7 is a block diagram illustrating only some components of FIG. 1 to describe an operation of the video system illustrated in FIG. 1.

FIG. 7 is a block diagram illustrating only some components of FIG. 1 to describe an operation of the video system illustrated in FIG. 1.

Referring to FIG. 7, when performing an encoding operation, the operations of the codec controller 100, the codec 200, and the DPB 550 are as follows.

The image frame FR may be sent to the codec controller 100. For example, the image frame FR may be sent from the memory 500 or from the camera 300. The image frame FR may be sent to the DPB 550 and may be used in the form of a reference frame when the codec 200 encodes the image frame FR.

In this case, when the image frame FR is sent to the codec 200 without allocating the buffer within the DPB 550, or when the size of the buffer in the DPB 550 is smaller than the resolution of the image frame FR, the codec 200 may request the codec controller 100 to allocate a buffer of a new size.

In addition, when the size of the buffer in the DPB 550 is greater than or equal to the resolution of the image frame FR, the image frame FR may be encoded by the codec 200. An encoded image frame EN_FR, which is formed by being encoded by the codec 200, may be sent to the codec controller 100. The codec controller 100 may send the encoded image frame EN_FR to another component (e.g., memory 500) within the video system 1000.

Figure 8:
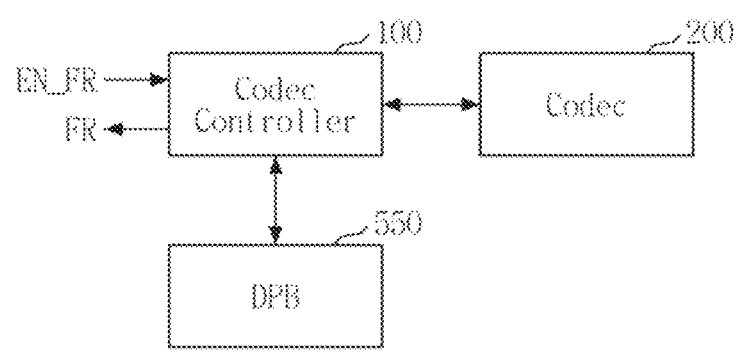
FIG. 8 is a block diagram illustrating only some components of FIG. 1 to describe an operation of the video system illustrated in FIG. 1.

FIG. 8 is a block diagram illustrating only some components of FIG. 1 to describe an operation of the video system illustrated in FIG. 1. Since FIG. 8 is similar to FIG. 7, differences will be mainly described and redundant descriptions may be omitted. To the extent that the description of various elements are omitted, it may be assumed that these elements are at least similar to corresponding elements that have already been described.

Referring to FIG. 8, when performing a decoding operation, the operations of the codec controller 100, the codec 200, and the DPB 550 are as follows.

The encoded image frame EN_FR may be sent to the codec controller 100. For example, the encoded image frame EN_FR may be sent from the memory 500. The encoded image frame EN_FR decoded by the codec 200 may be sent to the DPB 550 and used in the form of a reference frame when the codec 200 decodes the encoded image frame EN_FR.

In this case, when the encoded image frame EN_FR is sent to the codec 200 without allocating the buffer within the DPB 550, or the size of the buffer in the DPB 550 is smaller than the resolution of the encoded image frame EN_FR, the codec 200 may request the codec controller 100 to allocate a buffer of a new size.

In addition, when the size of the buffer in the DPB 550 is greater than or equal to the resolution of the encoded image frame EN_FR, the encoded image frame EN_FR may be decoded by the codec 200. An image frame FR that is formed by being decoded by the codec 200 may be sent to the codec controller 100. The codec controller 100 may send the image frame FR to another component (e.g., display) within the video system 1000.

Figure 9:
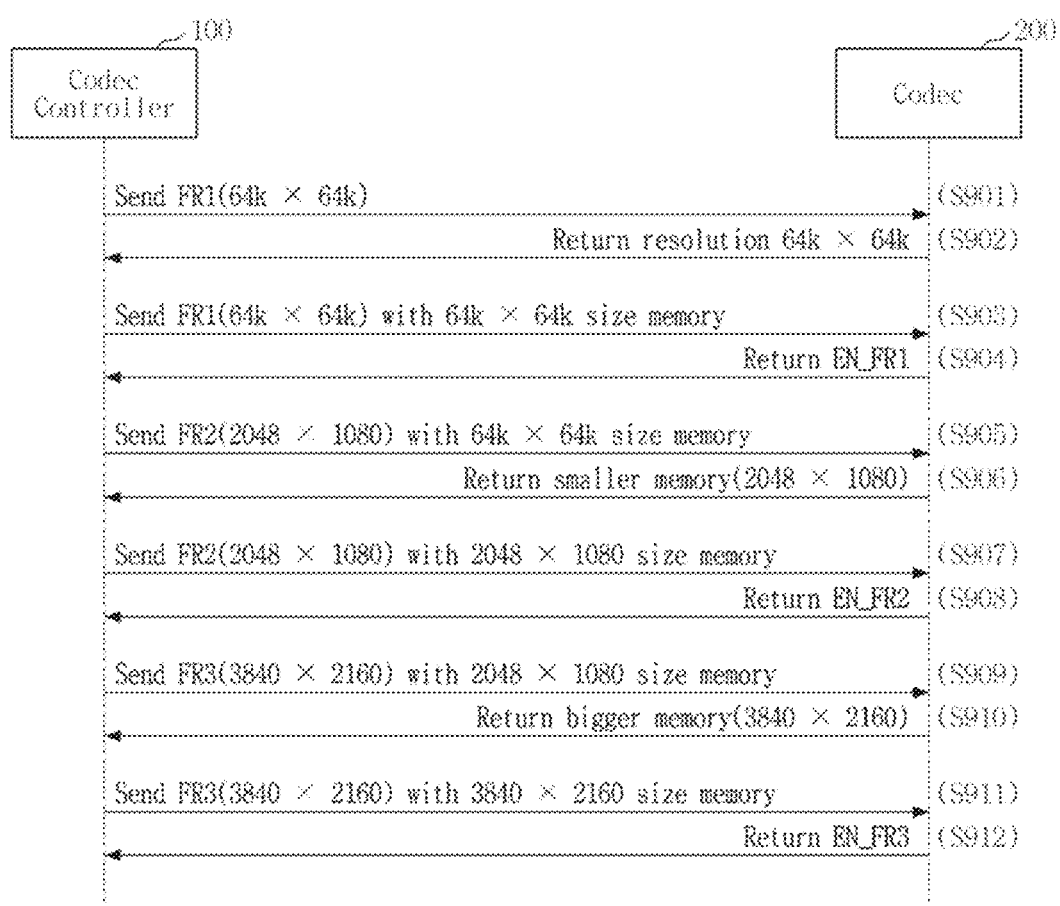
FIG. 9 is a flowchart describing an operation of a video system according to exemplary embodiments of the present inventive concept.

FIG. 9 is a flowchart for describing an operation of a video system according to exemplary embodiments of the present inventive concept. The specific values of the buffer size and frame resolution described in FIG. 9 are examples for convenience of explanation, and the exemplary embodiment of the present inventive concept is not limited thereto.

Referring to FIGS. 7 and 9, an operation of a video system according to exemplary embodiments of the present inventive concept may be as follows.

The codec controller 100 may send a first image frame FR1 with a first resolution (e.g., may be 64 k*64 k, hereinafter, referred to as 8K) to the codec 200 without allocating the DPB 550 (S901).

The codec 200 may request a buffer of a first size (8K) corresponding to the first resolution (8K) from the codec controller 100 (S902).

The codec controller 100 may allocate the buffer of the first size (8K) in the DPB 550 and send the first image frame FR1 with the first resolution (8K) to the codec 200 (S903).

The codec 200 may send a first encoded image frame EN_FR1 obtained by encoding the first image frame FR1 to the codec controller 100 (S904).

The codec controller 100 may allocate the buffer of the first size (8K) in the DPB 550 and send a second image frame FR2 with a second resolution (e.g., may be 2048*1080, hereinafter, referred to as 2K) smaller than the first resolution (8K) to the codec 200 (S905).

The codec 200 may request a buffer of a second size (2K) corresponding to the second resolution (2K) from the codec controller 100 (S906).

The codec controller 100 may allocate the buffer of the second size (2K) in the DPB 550 and send the second image frame FR2 with the second resolution (2K) to the codec 200 (S907).

The codec 200 may send a second encoded image frame EN_FR2 that is obtained by encoding the second image frame FR2 to the codec controller 100 (S908).

The codec controller 100 may allocate the buffer of the second size (2K) in the DPB 550 and send a third image frame FR3 with a third resolution (e.g., may be 3048*2160, hereinafter, referred to as 4K) that is greater than the second resolution (2K) to the codec 200 (S909).

The codec 200 may request a buffer of a third size (4K) corresponding to the third resolution (4K) from the codec controller 100 (S910).

The codec controller 100 may allocate the buffer of the third size (4K) in the DPB 550 and send the third image frame FR3 with the third resolution (4K) to the codec 200 (S911).

The codec 200 may send a third encoded image frame EN_FR3, which is obtained by encoding the third image frame FR3, to the codec controller 100 (S912).

For example, as interaction between the codec controller 100 and the codec 200 is performed every time each image frame is sent, a buffer with a size that corresponds to the resolution of each image frame may be allocated within the DPB 550. Through this, a wasted memory space may be minimized.

FIG. 10 is a table describing the effects of a video system according to exemplary embodiments of the present inventive concept.

Referring to FIG. 10, each figure in the table assumes that the first image frame is 8K and that 9 image frames of which the resolution changes to 2K and 4K for each image frame are encoded or decoded. In the following, the description is based on encoding, but the same may also be applied to decoding.

For example, when a buffer of a size that corresponds to a maximum image frame size in the stream is allocated (Max), a buffer of a size of 65536*65536 (8K) is used per image frame. Therefore, when encoding 9 image frames, a buffer of a total size of 38,654,705,664 is used. Two interactions occur between the codec controller 100 and the codec 200 for each image frame. For example, the interactions include sending an image frame from the codec controller 100 to the codec 200 and sending an encoded image frame from the codec 200 to the codec controller 100. Therefore, when encoding 9 image frames, a total of 18 interactions occur.

In addition, according to an exemplary embodiment of the present inventive concept described with reference to FIGS. 7 and 9 (Method 1), one 8K buffer, four 2K buffers, and four 4K buffers are used. Therefore, when encoding 9 image frames, a buffer of a total size of 75,202,560 is used. As described with reference to FIG. 9, four interactions occur for each image frame between the codec controller 100 and the codec 200 (e.g., S901 to S904 in FIG. 9). Therefore, when encoding 9 image frames, a total of 36 interactions occur.

In this way, waste of the memory may be effectively prevented through the interaction between the codec controller 100 and the codec 200.

Figure 11:
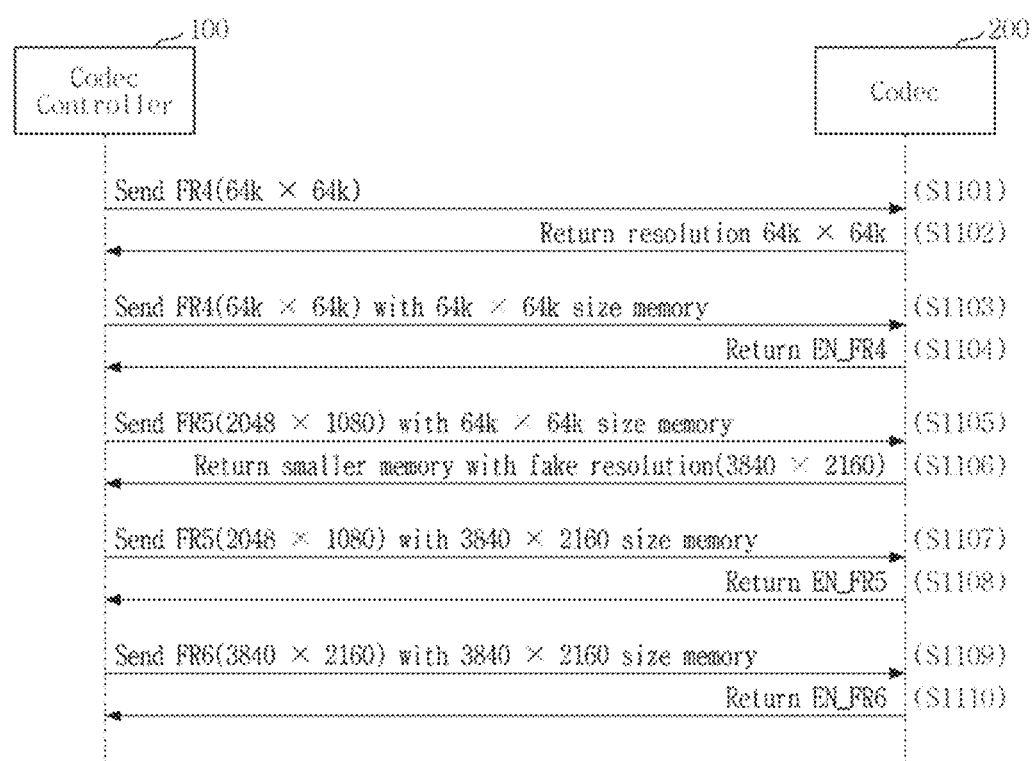
FIG. 11 is a flowchart for describing an operation of a video system according to exemplary embodiments of the present inventive concept.

FIG. 11 is a flowchart describing an operation of a video system according to exemplary embodiments of the present inventive concept. The specific values of the buffer size and frame resolution described in FIG. 11 are examples for convenience of explanation, and the exemplary embodiment of the present inventive concept is not limited thereto.

Referring to FIGS. 7 and 11, an operation of a video system according to exemplary embodiments of the present inventive concept may be as follows.

The codec controller 100 may send a fourth image frame FR4 with a fourth resolution (e.g., may be 64 k*64 k, hereinafter, referred to as 8K) to the codec 200 without allocating the DPB 550 (S1101).

The codec 200 may request a buffer of a fourth size (8K) corresponding to the fourth resolution (8K) from the codec controller 100 (S1102).

The codec controller 100 may allocate the buffer of the fourth size (8K) in the DPB 550 and send the fourth image frame FR4 with the fourth resolution (8K) to the codec 200 (S1103).

The codec 200 may send a fourth encoded image frame EN_FR4, which is obtained by encoding the fourth image frame FR4, to the codec controller 100 (S1104).

The codec controller 100 may allocate the buffer of the fourth size (8K) in the DPB 550 and send a fifth image frame FR5 with a fifth resolution (e.g., may be 2048 k*1080 k, hereinafter, referred to as 2K) that is smaller than the fourth resolution (8K) to the codec 200 (S1105).

The codec 200 may request a buffer of a sixth size (4K) corresponding to a sixth resolution (e.g., may be 3840*2160, hereinafter, referred to as 4K) greater than the fifth resolution (2K) from the codec controller 100 (S1106). For example, if it is possible to allocate a buffer with a size smaller than the size (e.g., a) of the allocated buffer and a size (e.g., b) greater than the resolution of the sent image frame, the codec may request a buffer of a size corresponding to the range from b to a from the codec controller. For example, a buffer of the sixth size (4K), which is smaller than the buffer of the fourth size (8K) and greater than the buffer of the fifth size (2K), may be requested as fake resolution. For example, the fake resolution refers to a buffer that the codec 200 requests from the codec controller 100, considering a trade-off between the memory size and memory performance. In addition, a size of the fake resolution may be greater than the resolution of the image frame that the codec 200 receives from the codec controller 100.

By using the fake resolution, the number of interactions between the codec controller 100 and the codec 200 may be reduced while efficiently using the memory space. Through this, the memory space and performance may be balanced.

The codec controller 100 may allocate the buffer of the sixth size (4K) in the DPB 550 and send the fifth image frame FR5 with the fifth resolution (2K) to the codec 200 (S1107).

The codec 200 may send a fifth encoded image frame EN_FR5 that is obtained by encoding the fifth image frame FR5 to the codec controller 100 (S1108).

The codec controller 100 may allocate the buffer of the sixth size (4K) in the DPB 550 and send a sixth image frame FR6 with a sixth resolution (e.g., may be 3048*2160, hereinafter, referred to as 4K) to the codec 200 (S1109).

The codec 200 may send a sixth encoded image frame EN_FR6 that is obtained by encoding the sixth image frame FR6 to the codec controller 100 (S1110).

As described in S1106 to S1110, by using the fake resolution, the number of interactions between the codec controller 100 and the codec 200 may be reduced while efficiently using the memory space. Through this, the memory space and performance may be balanced.

FIG. 12 is a table for describing the effects of a video system according to exemplary embodiments of the present inventive concept.

Referring to FIG. 12, each figure in the table assumes that the first image frame is 8K and that 9 image frames of which the resolution changes to 2K and 4K for each image frame are encoded or decoded. In the following, the description is based on encoding, but the same may also be applied to decoding.

For example, when a buffer of a size corresponding to a maximum image frame size in the stream is allocated (Max), a buffer of a size of 65536*65536 (8K) is used per image frame. Therefore, when encoding 9 image frames, a buffer of a total size of 38,654,705,664 is used. Two interactions may occur between the codec controller 100 and the codec 200 for each image frame. For example, the interactions include sending an image frame from the codec controller 100 to the codec 200 and sending an encoded image frame from the codec 200 to the codec controller 100. Therefore, when encoding 9 image frames, a total of 18 interactions occur.

In addition, according to an exemplary embodiment of the present inventive concept described with reference to FIGS. 7 and 11 (Method 2), one 8K buffer and eight 4K buffers are used. Therefore, when encoding 9 image frames, a buffer of a total size of 99,532,800 is used. As described with reference to FIG. 11, four interactions each occur between the codec controller 100 and the codec 200 in the fourth image frame FR4 and the fifth image frame FR5 (e.g., S1101 to S1104 and S1105 to S1108 in FIG. 11). In addition, two interactions each occur in the remaining image frames. Therefore, when encoding 9 image frames, a total of 22 interactions occur.

In this way, by using the fake resolution, the number of interactions between the codec controller 100 and the codec 200 may be reduced while efficiently using the memory space. Through this, the memory space and performance may be balanced.

Figure 13:
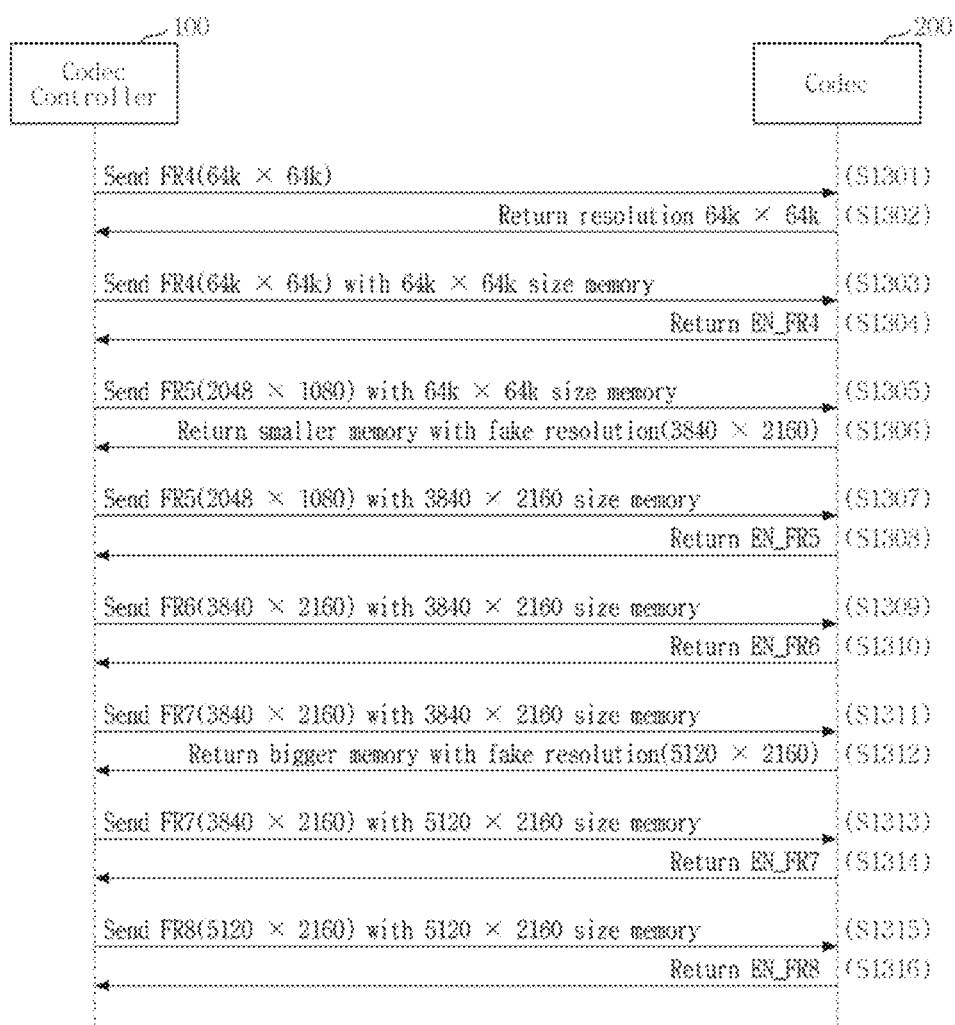
FIG. 13 is a flowchart for describing an operation of a video system according to exemplary embodiments of the present inventive concept.

FIG. 13 is a flowchart for describing an operation of a video system according to exemplary embodiments of the present inventive concept. The specific values of the buffer size and frame resolution described in FIG. 13 are examples for convenience of explanation, and the exemplary embodiment of the present inventive concept is not limited thereto. A scenario in FIG. 13 corresponds to a further expanded exemplary embodiment of the scenario in FIG. 11, and S1301 to S1310 in FIG. 13 correspond to steps corresponding to S1101 to S1110 in FIG. 11, respectively. Therefore, in the following, the description will start from S1311.

Referring to FIGS. 7, 11, and 13, an operation of a video system according to exemplary embodiments of the present inventive concept may be as follows.

The codec controller 100 may allocate the buffer of the sixth size (4K) in the DPB 550 and may send a seventh image frame FR7 with a seventh resolution (e.g., may be 3048*2160, hereinafter, referred to as 4K) to the codec 200 (S1311). For example, the image frames with the same resolution as each other may be continuously sent.

The codec 200 may request a buffer of an eighth size (5K) corresponding to an eighth resolution (e.g., may be 5120*2160, hereinafter, referred to as 5K) greater than the seventh resolution (4K) from the codec controller 100 (S1312). For example, if it is possible to allocate a buffer with a size (e.g., b) greater than the resolution of the sent image frame, the codec may request a buffer with a size of b or more from the codec controller. For example, the codec may request the buffer of the eighth size (5K), which is greater than the buffer of the seventh size (4K), as fake resolution.

The codec controller 100 may allocate the buffer of the eighth size (5K) in the DPB 550 and may send a seventh image frame FR7 with a seventh resolution (e.g., may be 3048*2160, hereinafter, referred to as 4K) to the codec 200 (S1313).

The codec 200 may send a seventh encoded image frame EN_FR7, which is obtained by encoding the seventh image frame FR7, to the codec controller 100 (S1314).

The codec controller 100 may allocate the buffer of the eighth size (5K) in the DPB 550 and may send the eighth image frame FR8 with the eighth resolution (5K) to the codec 200 (S1315).

The codec 200 may send an eighth encoded image frame EN_FR8, which is obtained by encoding the eighth image frame FR8, to the codec controller 100 (S1316).

As described in S1309 to S1316, by using the fake resolution, the number of interactions between the codec controller 100 and the codec 200 may be reduced while efficiently using the memory space. Through this, the memory space and performance may be balanced.

Figure 14:
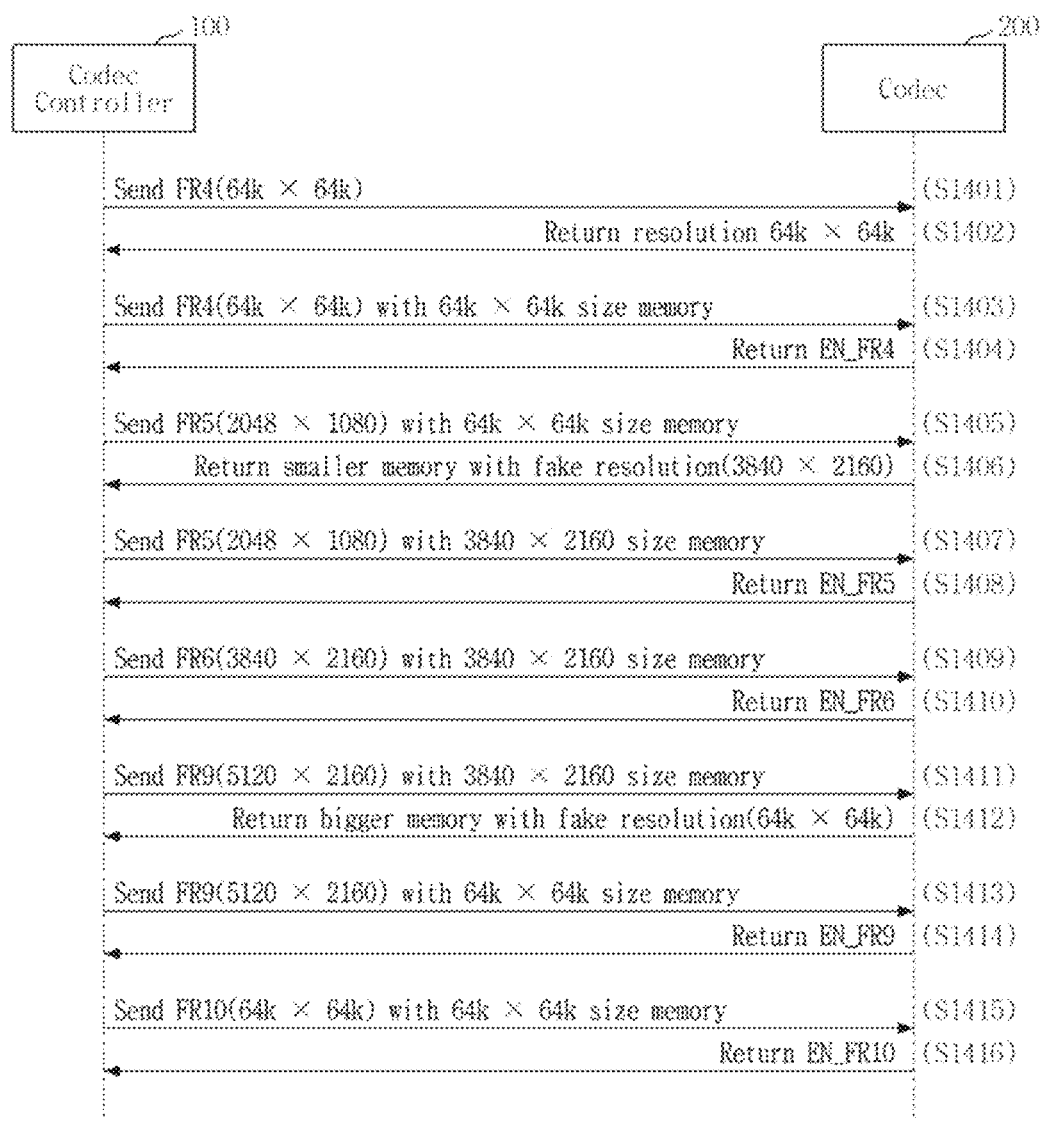
FIG. 14 is a flowchart for describing an operation of a video system according to exemplary embodiments of the present inventive concept.

FIG. 14 is a flowchart for describing an operation of a video system according to exemplary embodiments of the present inventive concept. The specific values of the buffer size and frame resolution described in FIG. 14 are examples for convenience of explanation, and the exemplary embodiment of the present inventive concept is not limited thereto. A scenario in FIG. 14 corresponds to a further expanded exemplary embodiment of the scenario in FIG. 11, and S1401 to S1410 in FIG. 14 correspond to steps corresponding to S1101 to S1110 in FIG. 11, respectively. Therefore, in the following, the description will start from S1411.

Referring to FIGS. 7, 11, and 14, an operation of a video system according to exemplary embodiments of the present inventive concept may be as follows.

The codec controller 100 may allocate the buffer of the sixth size (4K) in the DPB 550 and send a ninth image frame with a ninth resolution (e.g., may be 5120*2160, hereinafter, referred to as 5K) to the codec 200 (S1411). For example, an image frame with a resolution that is greater than the size of the allocated buffer may be sent.

The codec 200 may request a buffer of a tenth size (8K) corresponding to a tenth resolution (e.g., may be 64 k*64 k, hereinafter, referred to as 8K) that is greater than the ninth resolution (5K) from the codec controller 100 (S1412). For example, if it is possible to allocate a buffer with a size (e.g., b) greater than the resolution of the sent image frame, the codec may request a buffer with a size of b or more from the codec controller 100. For example, the codec 200 may request the buffer of the tenth size (8K), which is greater than the buffer of the ninth size (5K), as fake resolution.

The codec controller 100 may allocate the buffer of the tenth size (8K) in the DPB 550 and may send the ninth image frame FR9 with the ninth resolution (5K) to the codec 200 (S1413).

The codec 200 may send a ninth encoded image frame EN_FR9, which is obtained by encoding the ninth image frame FR9, to the codec controller 100 (S1414).

The codec controller 100 may allocate the buffer of the tenth size (8K) in the DPB 550 and may send the tenth image frame FR10 with the tenth resolution (8K) to the codec 200 (S1415).

The codec 200 may send a tenth encoded image frame EN_FR10, which is obtained by encoding the tenth image frame FR10, to the codec controller 100 (S1416).

As described in S1409 to S1416, by using the fake resolution, the number of interactions between the codec controller 100 and the codec 200 may be reduced while efficiently using the memory space. Through this, the memory space and performance may be balanced.

Figure 15:
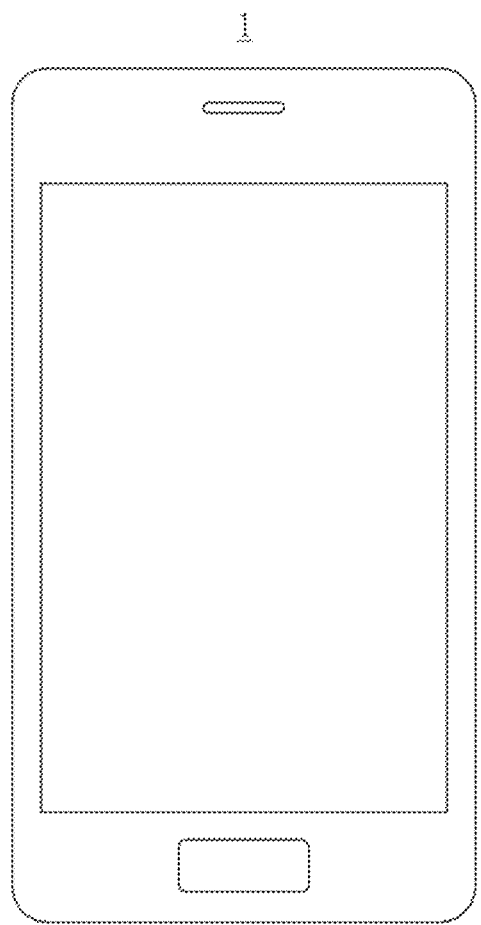
FIG. 15 is an exemplary diagram for describing an electronic device including a video system according to exemplary embodiments of the present inventive concept.

FIG. 15 is a diagram for describing an electronic device including a video system according to exemplary embodiments of the present inventive concept.

Referring to FIG. 15, an electronic device 1 including a video system according to exemplary embodiments of the present inventive concept may be a smartphone, but the present inventive concept is not limited thereto.

For example, the electronic device 1 including the video system according to exemplary embodiments of the present inventive concept may be implemented as a television (TV), a digital TV (DTV), an internet protocol TV (IPTV), a personal computer (PC), a desktop computer, a lap-top computer, a computer workstation, a tablet PC, a video game platform (or a video game console), a server, or a portable electronic device.

The portable electronic device may also be implemented as, for example, a smart phone, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an Internet of Things (IoT) device, an Internet of Everything (IoE) device, or an e-book.

Figure 16:
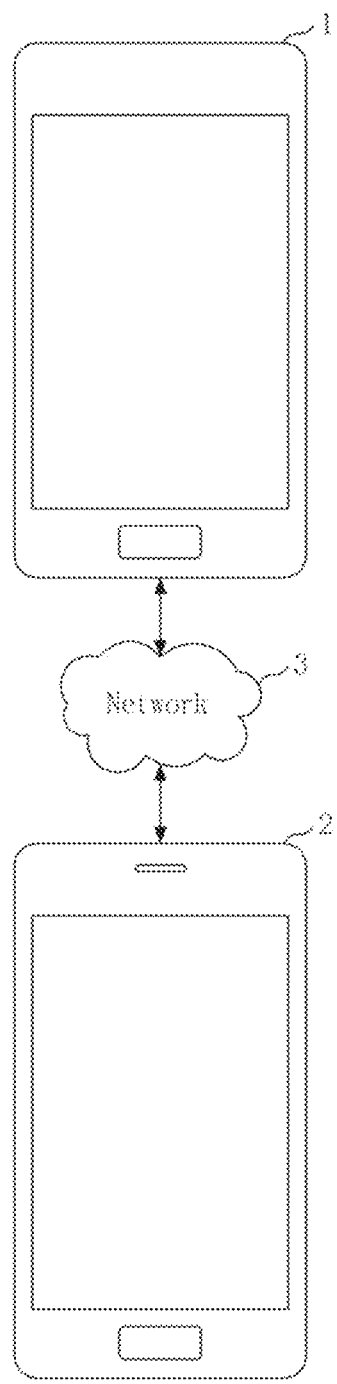
FIG. 16 is a diagram describing a network system between electronic devices including a video system according to exemplary embodiments of the present inventive concept.

FIG. 16 is a diagram describing a network system between electronic devices including a video system according to exemplary embodiments of the present inventive concept.

Referring to FIG. 16, a network system may include an image providing device 1 and an image receiving device 2.

The image providing device 1 may provide image signals including video and images to the image receiving device 2 through a network 3 in the streaming form, and the image receiving device 2 may receive and reproduce the image signals from the image providing device 1. The image providing device 1 may encode the image signal by removing and compressing redundant information in the image signal to a point where it might not be visually detected. The image providing device 1 may efficiently store, send, and manage the image signals by encoding the image signals within a predetermined compression rate range. The image signals may include a real-time encoded image including a screen mirroring image, a video conference image, and a game image.

The image providing device 1 may include various image source devices such as a TV, a PC, a smart phone, a tablet, a set-top box, a game console, and a server, and the image receiving device 2 may include various image playback devices such as a TV, a smart phone, a tablet, and a PC.

It is obvious to those skilled in the art that the image providing device 1 and the image receiving device 2 are not limited to a specific type of device. The image providing device 1 and the image receiving device 2 may transmit and receive the image signals through the network 3. According to various exemplary embodiments of the present inventive concept, the network 3 connecting the image providing device 1 and the image receiving device 2 to each other to facilitate the transmission of image signals may include, for example, a near-field communication network and a cellular network, such as Wireless Fidelity (WiFi), a next-generation telecommunications network, the Internet, or a telecommunications network such as a computer network (e.g., LAN or WAN), and may communicate based on the IP communication protocol. The cellular network may include, for example, Global System for Mobile Communications (GSM), Enhanced Data GSM Environment (EDGE), Code Division Multiple Access (CDMA), Time Division Multiplexing Access (TDMA), 5G, Long Term Evolution (LTE), and LTE-Advance (LTE-A). The network 3 may include connections of network elements such as hubs, bridges, routers, switches, and gateways. The network 3 may include one or more connected networks, including public networks such as the Internet and private networks such as corporate private networks, such as a multi-network environment. Access to the network 3 may be provided via one or more wired or wireless access networks. Furthermore, the network 3 may support an Internet of Things (IoT) network that exchanges and processes information between distributed components such as objects.

While the present inventive concept has been described with reference to embodiments thereof, it will be understood by those of ordinary skill in the art that various changes in form and details may be made thereto without departing from the spirit and scope of the present inventive concept.

What is claimed is:

1. A system on chip (SoC) comprising:
   a codec configured to encode a plurality of image frames; and
   a codec controller configured to send the plurality of image frames to the codec and to allocate a buffer for encoding the plurality of image frames in a memory,
   wherein the codec controller sends a first image frame with a first resolution to the codec without allocating the buffer,
   the codec requests the codec controller to allocate a first buffer of a first size that corresponds to the first resolution, in response to receiving the first image frame,
   the codec controller allocates the first buffer to the memory and sends the first image frame to the codec,
   the codec encodes the first image frame by using the first buffer and then sends the encoded first image frame to the codec controller,
   the codec controller allocates the first buffer to the memory and sends a second image frame with a second resolution that is smaller than the first resolution to the codec,
   the codec requests the codec controller to allocate a second buffer of a second size that is smaller than the first size, in response to receiving the second image frame,
   the codec controller allocates the second buffer to the memory and sends the second image frame to the codec, and
   the codec encodes the second image frame by using the second buffer and then sends the encoded second image frame to the codec controller.

2. The system on chip (SoC) of claim 1, wherein the second size is a size corresponding to the second resolution.

3. The system on chip (SoC) of claim 2, wherein the codec controller allocates the second buffer to the memory and sends a third image frame with a third resolution that is greater than the second resolution to the codec,
   the codec requests the codec controller to allocate a third buffer of a third size corresponding to the third resolution, in response to receiving the third image frame,
   the codec controller allocates the third buffer to the memory and sends the third image frame to the codec, and
   the codec encodes the third image frame by using the third buffer and then sends the encoded third image frame to the codec controller.

4. The system on chip (SoC) of claim 1, wherein the second size is a size corresponding to a third resolution that is greater than the second resolution.

5. The system on chip (SoC) of claim 4, wherein the codec controller allocates the second buffer to the memory and sends a third image frame with the third resolution to the codec, and
   the codec encodes the third image frame by using the second buffer and then sends the encoded third image frame to the codec controller.

6. The system on chip (SoC) of claim 5, wherein the codec controller allocates the second buffer to the memory and sends a fourth image frame with the third resolution to the codec,
   the codec requests the codec controller to allocate a fourth buffer of a fourth size that corresponds to a fourth resolution that is greater than the third resolution, in response to receiving the fourth image frame,
   the codec controller allocates the fourth buffer to the memory and sends the fourth image frame to the codec,
   the codec encodes the fourth image frame by using the fourth buffer and then sends the encoded fourth image frame to the codec controller,
   the codec controller allocates the fourth buffer to the memory and sends a fifth image frame with the fourth resolution to the codec, and
   the codec encodes the fifth image frame by using the fourth buffer and then sends the encoded fifth image frame to the codec controller.

7. The system on chip (SoC) of claim 5, wherein the codec controller allocates the second buffer to the memory and sends a fourth image frame with a fourth resolution that is greater than the third resolution to the codec,
the codec requests the codec controller to allocate the first buffer of the first size that corresponds to the first resolution that is greater than the fourth resolution, in response to receiving the fourth image frame,
the codec controller allocates the first buffer to the memory and sends the fourth image frame to the codec,
the codec encodes the fourth image frame by using the first buffer and then sends the encoded fourth image frame to the codec controller,
the codec controller allocates the first buffer to the memory and sends a fifth image frame with the first resolution to the codec, and
the codec encodes the fifth image frame by using the first buffer and then sends the encoded fifth image frame to the codec controller.

8. The system on chip (SoC) of claim 1, wherein the buffer is a decoded picture buffer (DPB).

9. The system on chip (SoC) of claim 1, wherein the codec sequentially decodes a plurality of encoded image frames,
the codec controller sends the plurality of encoded image frames to the codec and allocates a decoding buffer for decoding the plurality of encoded image frames in a memory,
the codec controller sends a first encoded image frame with a third resolution to the codec without allocating the decoding buffer,
the codec requests the codec controller to allocate a first decoding buffer that corresponds to the third resolution, in response to receiving the first encoded image frame,
the codec controller allocates the first decoding buffer to the memory and sends the first encoded image frame to the codec,
the codec decodes the first encoded image frame using the first decoding buffer and then sends the decoded first encoded image frame to the codec controller,
the codec controller allocates the first decoding buffer to the memory and sends a second encoded image frame with a fourth resolution that is smaller than the third resolution to the codec,
the codec requests the codec controller to allocate a second decoding buffer of a fourth size that is smaller than the third size, in response to receiving the second encoded image frame,
the codec controller allocates the second decoding buffer to the memory and sends the second encoded image frame to the codec, and
the codec decodes the second encoded image frame by using the second decoding buffer and then sends the decoded second encoded image frame to the codec controller.

10. A method for operating a system on chip (SoC) including a codec that is configured to sequentially encode a plurality of image frames, and a codec controller that is configured to send the plurality of image frames to the codec and allocate a buffer for encoding the plurality of image frames in a memory, the method comprising:
sending a first image frame with a first resolution to the codec without allocating the buffer, through the codec controller;
requesting, through the codec, the codec controller to allocate a first buffer of a first size corresponding to the first resolution, in response to receiving the first image frame;
allocating the first buffer to the memory and sending the first image frame to the codec, through the codec controller;
encoding the first image frame by using the first buffer and then sending the encoded first image frame to the codec controller, through the codec;
allocating the first buffer to the memory and sending a second image frame with a second resolution that is smaller than the first resolution to the codec, through the codec controller;
requesting the codec controller to allocate a second buffer of a second size that is smaller than the first size, in response to receiving the second image frame;
allocating the second buffer to the memory and sending the second image frame to the codec; and
encoding the second image frame by using the second buffer and then sending the encoded second image frame to the codec controller.

11. The method of claim 10, wherein the second size is a size that corresponds to the second resolution.

12. The method of claim 11, further comprising:
allocating the second buffer to the memory and sending a third image frame with a third resolution that is greater than the second resolution to the codec, through the codec controller;
requesting the codec controller to allocate a third buffer of a third size that corresponds to the third resolution, in response to receiving the third image frame, through the codec;
allocating the third buffer to the memory and sending the third image frame to the codec, through the codec controller; and
encoding the third image frame by using the third buffer and then sending the encoded third image frame to the codec controller, through the codec.

13. The method of claim 10, wherein the second size is a size that corresponds to a third resolution that is greater than the second resolution.

14. The method of claim 13, further comprising:
allocating the second buffer to the memory and sending a third image frame with the third resolution to the codec, through the codec controller; and
encoding the third image frame by using the second buffer and then sending the encoded third image frame to the codec controller, through the codec.

15. The method of claim 14, further comprising:
allocating the second buffer to the memory and sending a fourth image frame with the third resolution to the codec, through the codec controller;
requesting the codec controller to allocate a fourth buffer of a fourth size that corresponds to a fourth resolution that is greater than the third resolution, in response to receiving the fourth image frame, through the codec;
allocating the fourth buffer to the memory and sending the fourth image frame to the codec, through the codec controller;
encoding the fourth image frame using the fourth buffer and then sending the encoded fourth image frame to the codec controller, through the codec;
allocating the fourth buffer to the memory and sending a fifth image frame with the fourth resolution to the codec, through the codec controller; and
encoding the fifth image frame by using the fourth buffer and then sending the encoded fifth image frame to the codec controller, through the codec.

16. The method of claim 14, further comprising:
allocating the second buffer to the memory and sending a fourth image frame with a fourth resolution that is greater than the third resolution to the codec, through the codec controller;
requesting the codec controller to allocate the first buffer of the first size that corresponds to the first resolution that is greater than the fourth resolution, in response to receiving the fourth image frame, through the codec;
allocating the first buffer to the memory and sending the fourth image frame to the codec, through the codec controller;
encoding the fourth image frame using the first buffer and then sending the encoded fourth image frame to the codec controller, through the codec;
allocating the first buffer to the memory and sending a fifth image frame with the first resolution to the codec, through the codec controller; and
encoding the fifth image frame by using the first buffer and then sending the encoded fifth image frame to the codec controller, through the codec.

17. The method of claim 10, wherein the buffer is a decoded picture buffer (DPB).

18. A video system comprising:
a codec configured to encode a plurality of image frames;
a codec controller configured to send the plurality of image frames to the codec and to allocate a buffer for encoding the plurality of image frames in a memory;
a camera configured to send the plurality of image frames to the codec controller; and
a display configured to display the plurality of image frames,
wherein the codec controller sends a first image frame with a first resolution to the codec without allocating the buffer,
the codec requests the codec controller to allocate a first buffer of a first size that corresponds to the first resolution, in response to receiving the first image frame,
the codec controller allocates the first buffer to the memory and sends the first image frame to the codec,
the codec encodes the first image frame by using the first buffer and then sends the encoded first image frame to the codec controller,
the codec controller allocates the first buffer to the memory and sends a second image frame with a second resolution that is smaller than the first resolution to the codec,
the codec requests the codec controller to allocate a second buffer of a second size that is smaller than the first size, in response to receiving the second image frame,
the codec controller allocates the second buffer to the memory and sends the second image frame to the codec, and
the codec encodes the second image frame by using the second buffer and then sends the encoded second image frame to the codec controller.

19. The video system of claim 18, wherein the second size is a size that corresponds to the second resolution,
the codec controller allocates the second buffer to the memory and sends a third image frame with a third resolution that is greater than the second resolution to the codec,
the codec requests the codec controller to allocate a third buffer of a third size that corresponds to the third resolution, in response to receiving the third image frame,
the codec controller allocates the third buffer to the memory and sends the third image frame to the codec, and
the codec encodes the third image frame by using the third buffer and then sends the encoded third image frame to the codec controller.

20. The video system of claim 18, wherein the second size is a size that corresponds to a third resolution that is greater than the second resolution,
the codec controller allocates the second buffer to the memory and sends a third image frame with the third resolution to the codec, and
the codec encodes the third image frame by using the second buffer and then sends the encoded third image frame to the codec controller.

* * * * *